US012192716B2

(12) United States Patent
Torno et al.

(10) Patent No.: US 12,192,716 B2
(45) Date of Patent: Jan. 7, 2025

(54) METHOD AND ASSOCIATED DEVICE FOR TRANSFORMING CHARACTERISTICS OF AN AUDIO SIGNAL

(71) Applicant: INNOVATION ELECTRO ACOUSTIQUE, Meroux (FR)

(72) Inventors: Jefferson Williams Torno, Perouse (FR); Julien Pierre Michel Santini, Beaucort (FR)

(73) Assignee: INNOVATION ELECTRO ACOUSTIQUE, Meroux (FR)

( * ) Notice: Subject to any disclaimer, the term of this patent is extended or adjusted under 35 U.S.C. 154(b) by 198 days.

(21) Appl. No.: 17/791,192

(22) PCT Filed: Jan. 5, 2021

(86) PCT No.: PCT/EP2021/050058

§ 371 (c)(1),
(2) Date: Jul. 6, 2022

(87) PCT Pub. No.: WO2021/140089

PCT Pub. Date: Jul. 15, 2021

(65) Prior Publication Data

US 2023/0069729 A1 Mar. 2, 2023

(30) Foreign Application Priority Data

Jan. 6, 2020 (FR) ....................................... 2000060

(51) Int. Cl.
*H04R 3/04* (2006.01)

(52) U.S. Cl.
CPC ...................................... *H04R 3/04* (2013.01)

(58) Field of Classification Search
CPC ........... G10H 1/0008; G10H 2210/036; G10H 2210/041; G10H 2250/311; G10L 19/22; G10L 25/30; G10L 25/51; G10L 25/54; H04R 1/28; H04R 3/04; H04S 2400/09; H04S 7/30

(Continued)

(56) References Cited

U.S. PATENT DOCUMENTS 6,697,492 B1 2/2004 Yamaguchi et al.
2012/0288124 A1* 11/2012 Fejzo ........................ H04R 5/02 381/303

(Continued)

FOREIGN PATENT DOCUMENTS

CA 2098319 C 1/2000
JP HO 415989 A * 10/1990 ............... H04R 1/02

(Continued)

OTHER PUBLICATIONS

Search Report for French Patent Application No. 2000060, dated Sep. 7, 2020.

(Continued)

*Primary Examiner* — Lun-See Lao
(74) *Attorney, Agent, or Firm* — MARSHALL, GERSTEIN & BORUN LLP

(57) ABSTRACT

A method and an associated device for the combined conversion of multiple characteristics of an audio signal are disclosed. The changes allow the signal to be typed on the basis of a profile selected by a control unit. The method and the device are particularly intended for the field of loudspeakers.

9 Claims, 13 Drawing Sheets

(58) Field of Classification Search
USPC ................................................ 381/98, 56–59
See application file for complete search history.

(56) References Cited

U.S. PATENT DOCUMENTS

| | | | | |
|---|---|---|---|---|
| 2013/0114830 | A1* | 5/2013 | Eastty | H04R 3/06<br>381/98 |
| 2015/0073574 | A1 | 3/2015 | Brenner et al. | |
| 2019/0288657 | A1* | 9/2019 | Arunachalam | G06F 16/68 |
| 2020/0372924 | A1* | 11/2020 | Kumar | G10L 25/54 |

FOREIGN PATENT DOCUMENTS

| | | | |
|---|---|---|---|
| JP | H04159898 | A | 6/1992 |
| JP | 2530474 | B2 | 9/1996 |
| JP | 2571091 | B2 | 1/1997 |

OTHER PUBLICATIONS

International Search Report and Written Opinion for PCT/EP2021/050058, mailed Apr. 12, 2021.

* cited by examiner (a)

(b)

(c)

METHOD AND ASSOCIATED DEVICE FOR TRANSFORMING CHARACTERISTICS OF AN AUDIO SIGNAL

FIELD

The present invention relates to a method and its associated device for transforming in a combined manner several characteristics of an audio signal intended for a loudspeaker. The device comprises, for all or part of the bands, a processor and an amplifier. The processor is connected to a control module allowing to select a mode of transformation of the signal characteristics.

BACKGROUND

By loudspeaker, is meant, in general, all types of electro and mechano-acoustic transducers.

From the publication U.S. Pat. No. 6,697,492 is known an acoustic loudspeaker system with digital signal processing.

The system compares the output signal with the input signal by means of a sensor. This comparison is used to make a correction so that the output signal conforms to the input signal.

This equalizer device allows the modification of a signal in gain (dB) on certain frequency bands with coefficients adapted to each bandwidth of the loudspeaker to correct.

The main disadvantage of this device is that it only acts on the gain parameter (dB). This correction makes it possible to achieve a linearity of the gain/frequency ratio but remains unsatisfactory with regard to all the other parameters which characterize the complex structure of a signal, such as the phase and the time. Indeed, the non-linearity of the phase and time do not allow the faithful reproduction of the original.

From the publication JP2571091 is known a frequency characteristic correction device for a loudspeaker. And from the publication JP2530474 is known the method related to it. They allow the modification of a signal in gain (dB) and in phase over the whole frequency spectrum. A digital auto-adaptive system intervenes on each frequency to linearize the amplitude/frequency curve and the phase/frequency curve. This device, with the help of a sensor, continuously corrects the signal.

The main disadvantage of the continuous correction is the delay in the treatment, and consequently does not function on the signals the reproduction time of which is less than the treatment time.

In addition, a spurious signal, such as noise in the room, can interfere with the processing.

From the publication CA2098319 is known an analog signal processing device for correcting harmonic and phase inaccuracies caused by the transduction, recording and live playback of audio signals.

The correction is automatically and continuously applied to restore the realism of the reproduced audio signal.

A permanent and constant correction does not allow the types of music listened to, requiring a different treatment, to be adapted.

From the publication US2015073574 is known a method allowing access to a content stream to be distributed to a playback device and then to identify a content allowing a determined profile to be delivered to it.

SUMMARY

Depending on the identified profiles, the method allows the modification of the equalization parameters related to the playback of the content stream.

This method makes it possible to adapt the equalization relative to the information available on the audio support, identified during playback, linked to the profile of the user or by a user setting.

The main disadvantage of this method is that it only offers an equalization correction, in other words, the correction of the gain (expressed in dB) as a function of the frequency. This correction remains unsatisfactory with respect to all the other parameters that characterize the complex structure of a signal, such as phase and time.

The present invention therefore aims to remedy these drawbacks. More particularly, it aims to provide a method and a related device which allow to modify all the characteristics of the complex structure of a signal such as:

The gain,
The phase,
The time,
The distortion,
The bandwidth,
The bandwidth distribution by loudspeaker,
Dynamics compression/expansion,
Directivity,
Sampling,
The absolute phase, corresponding to the electrical polarity of the loudspeaker group at the impulse response,
The shift of the reference point where all frequencies are in phase.

The combination of these modifications makes it possible to type, compensate or improve a sound in a precise and instantaneous way as a function of a typical profile.

By typing, is meant, in general, giving specific characteristics to the audio signal.

The method makes it possible to transform several characteristics of an audio signal in a combined way and is broken down into a series of actions which can be carried out in one or more stages.

The first action is to create a correction aimed at linearizing the output signal, taking into account the defects inherent in the components and the architecture of a loudspeaker. By loudspeaker, we mean a grouping of one or more loudspeakers installed in a closed or open structure.

Then depending on a determined profile, the second action is to apply a modification which relates to the whole of the signal characteristics.

These two signal transformation actions can be carried out in a single step, thus allowing all the selected transformations to be applied directly.

These modifications can also be applied in several steps thus allowing to dissociate the corrective action, to make the signal neutral, from the modification action to add a typing, a compensation, or an improvement. Thus, it becomes easier to control each of the actions. On the other hand, it allows to standardize the modification formulas, because they are applied on a neutral basis of the signal.

The invention relates to a method for transforming in a combined manner several characteristics of an audio signal intended for a loudspeaker, the method comprises the following actions:

The first corrective action is to measure the output signal of the loudspeaker(s) to determine the defects to be corrected as a function of a reference template, and then to generate the correction formula. This correction formula is then applied to linearize all the characteristics such as the equalization of gain, phase, time and distortion minimization. The correction applied in this way may therefore be different depending on the loudspeaker used.

The second action consists of modifying the neutral signal obtained previously in order to adapt it to a given profile. The modification can be done through one or more criteria such as: gain, phase, time, distortion, bandwidth, bandwidth distribution per loudspeaker, dynamic range compression/expansion, directivity, sampling, reference phase corresponding to the polarity of the group of loudspeakers with impulse response and displacement of the reference point where all frequencies are in phase.

According to advantageous, but not obligatory aspects of the invention, such a method may include one or more of the following features, taken in any technically permissible combination:

- The control module may be manually operated by the user.
- The control module may be automatically adjusted by selecting a typical profile based on music style information contained on a music track.
- The control module can be automatically adapted based on information contained in a remote service that recognizes the signal and identifies a typical profile.
- The control module can automatically adapt according to the preferences of the user, identified by the device.
- The control module can automatically adapt according to information received from sensors, present in the device or at a remote site, measuring climatic conditions such as air temperature, atmospheric pressure or humidity.

The present invention also relates to an associated device for transforming in a combined manner several characteristics of an audio signal intended for a loudspeaker comprising for all or part of the bands a signal transformation module. The transformation module is connected to a control module for selecting a mode of transformation of the signal characteristics depending on a determined profile.

According to advantageous, but not obligatory aspects of the invention, such a device may include one or more of the following features, taken in any technically permissible combination:

The transformation of the signal may be realized according to a digital method using a processor.

The transformation of the signal can be realized according to an analog method using electrical and/or electronic components.

The transformation of the signal can be realized by one or more mechanical means using tuned structures, acoustic lenses and/or a transformation of the geometrical characteristics of the device.

BRIEF DESCRIPTION OF THE DRAWINGS

Further features and advantages of the invention will become apparent from the following detailed description, for the understanding of which reference is made to the appended drawings.

DETAILED DESCRIPTION

Figure 1:
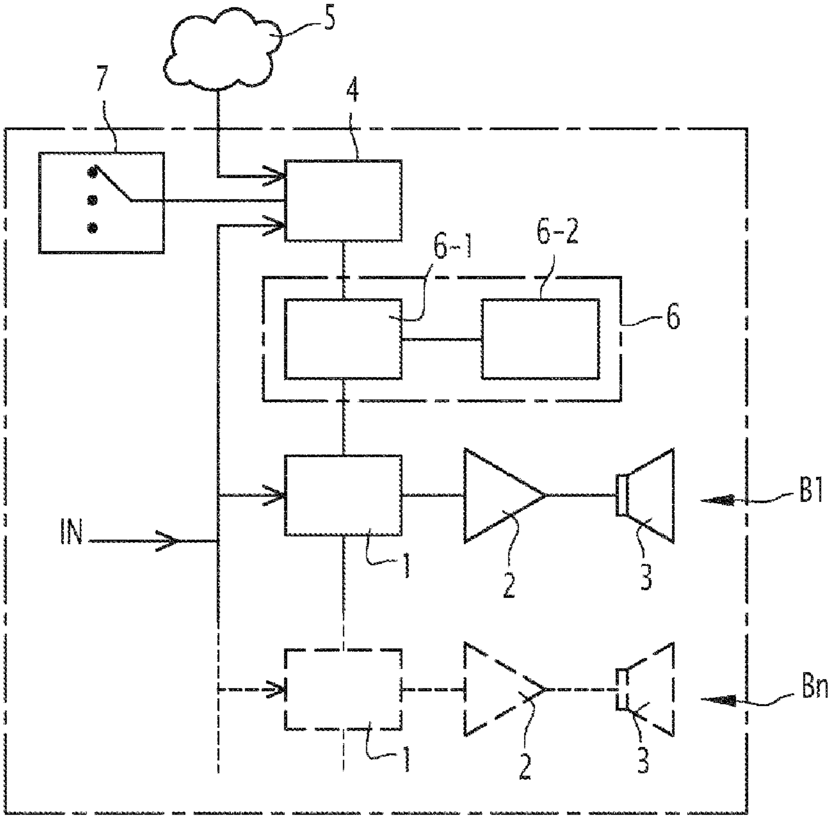
FIG. 1 is a schematic representation of the device according to the invention.

With reference to FIG. 1, the device in accordance with the invention comprises, for at least one frequency band, a processor 1, such as a digital or analog signal processor 1 (for example, in the form of discrete filters), which receives, in a wired or wireless manner, an audio signal that may be analog or digital. In FIG. 1, this acquired audio signal is marked IN.

This signal processor 1 can carry out the processing in an analog way using electrical or electronic components or in a digital way using a processor, such as a digital signal processor (DSP) or a micro control module. This signal is amplified in power in an analog or digital way by an amplifier 2. In the case of an analog-to-digital domain change, a converter, not shown in the figure, must be added to transform the signal from an analog signal to a digital signal.

This electrical signal is finally transformed into an acoustic signal by an electro-acoustic transducer, also called mechanical-acoustic transducer, such as a loudspeaker 3.

According to examples of implementation, as in the example of FIG. 1, the device may include a signal processing chain including such a processor 1, such an amplifier 2 and such a transducer 3 for each frequency band 1, En.

It is thus understood that, in this case, the device includes a processor 1, an amplifier 2 and a transducer 3, dedicated for each frequency band 1, En.

Alternatively, the device includes a common processor 1, amplifier 2 and transducer 3 for all frequency bands.

The device is completed with a control module 4, also called a mode decoder, for selecting and having signal changes applied to the device automatically, manually, or disabled. The selection by the user can be done through a selection module 7, comprising for example a human-machine interface.

In automatic mode, the device can either receive a profile from a remote service 5 such as Gracenote (registered trademark), or Shazam (registered trademark), or any equivalent service, with reference to publication US2015073574, or select a profile through a recognition system using an internal database, or thanks to artificial intelligence.

Optionally, the device can be completed with a mechanical or acoustic system 6 to modify the physical characteristics of the device. This modification system 6 can be realized, for example, by the modification of the volume of the acoustic load, by the application of an acoustic lens consisting of one or more deflectors, or by the modification of the characteristics of a resonator, or by any equivalent means.

Generally, the system 6 may include a mechanical-acoustic processor 6-1 and a mechanical-acoustic actuator 6-2.

In general, the device according to the invention allows the combined transformation of several characteristics of an audio signal, selected in a non-limiting manner from the following characteristics:

- the gain,
- the phase
- the time,
- the distortion,
- the bandwidth,
- bandwidth distribution per loudspeaker,
- dynamics compression/expansion,
- directivity,
- sampling,
- the absolute phase, corresponding to the electrical polarity (connection polarity) of the loudspeaker group at the impulse response,
- the displacement of the reference point where all frequencies are in phase.

The combination of several of these changes in the characteristics of the audio signal makes it possible to type, compensate or improve the corresponding sound precisely and instantly according to a typical profile. By "typing", we mean giving specific characteristics to the audio signal.

Figure 2:
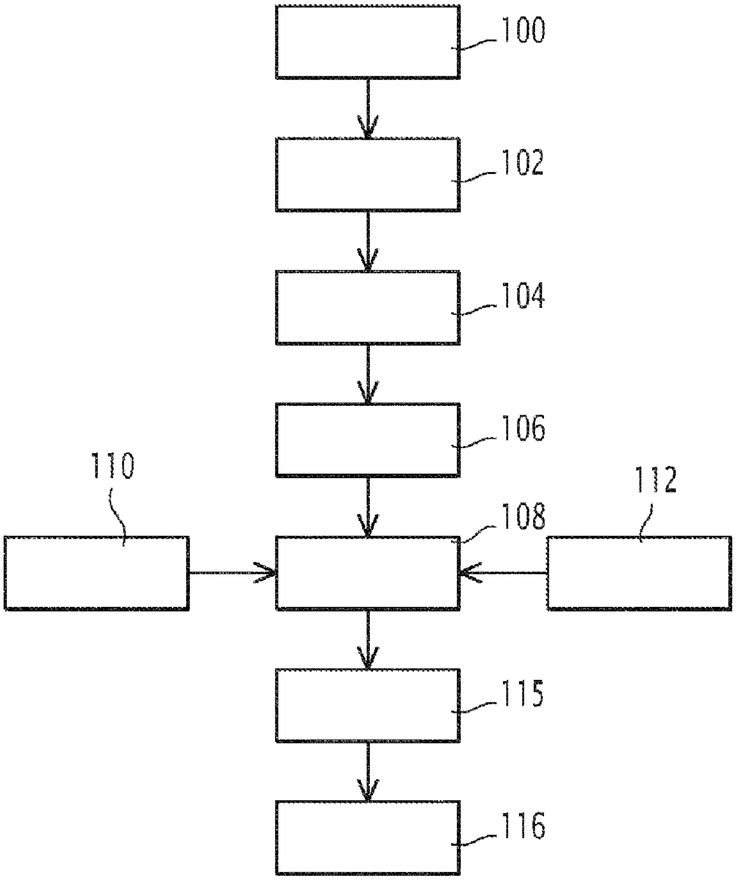
FIG. 2 illustrates the steps of the general signal transformation method.

The flow diagram in FIG. 2 shows the general method for transforming the signal, integrating a corrective action and another modification action according to one embodiment of the invention.

For example, the execution of the steps of the transformation method is controlled by the control module 4 of the device according to the invention.

The method begins in a step 100 by measuring the output signal of the loudspeakers. This measurement can be carried out in the laboratory at the time of the design of the device with the help of a system composed of a generator, a microphone and a signal processing system connected to a computer, the latter executing an information acquisition and processing software.

Then, the defects to be corrected are defined in a step 102 by the analysis of the differences between the input signal and a reference template. This latter represents the ideal curve of the related characteristic such as gain, phase, time and distortion.

Then, in step 104, a correction formula is developed on the basis of this analysis and the criteria selected. Depending on the type of processing chosen, it may include the application of an algorithm for digital processing, an analog processing plan composed of a set of electrical and/or electronic components, or an algorithm for controlling the mechanical system 6.

The system then applies, in a step 106, the correction formula to linearize all the characteristics of the signal, in order to reproduce its original neutrality. Depending on the type of processing chosen, the formula can be applied directly by the processor 1 in the case of digital processing, by active or passive filtering in the case of analog processing, or by the mechanical system 6 which can transform the geometric characteristics of the device.

Once the signal has been rendered linear, modification formulas are applied in the step 108 to type the characteristics according to a selected profile. These formulas are created beforehand by feedback depending on each profile sought, for example, a type of music, a type of sound recording, a type of reproduction or atmosphere. These formulas are chosen, for example, after the prior acquisition of a profile (step 110), depending on the profile selected in manual mode by the user or in automatic mode by the control module 4. In automatic mode, the device can receive a profile from the remote service 5 or from an internal database (step 112).

Then, in step 114, this signal is amplified in power in an analog or digital way by one or more of the amplifiers 2.

Finally, in step 116, this electrical signal is transformed into an acoustic signal by a loudspeaker 3, or by any equivalent transducer.

Optionally, the control module 4 adjusts automatically as a function of the information received by sensors, present in the device or on a remote site, measuring climatic conditions such as air temperature, atmospheric pressure or humidity.

Figure 3:
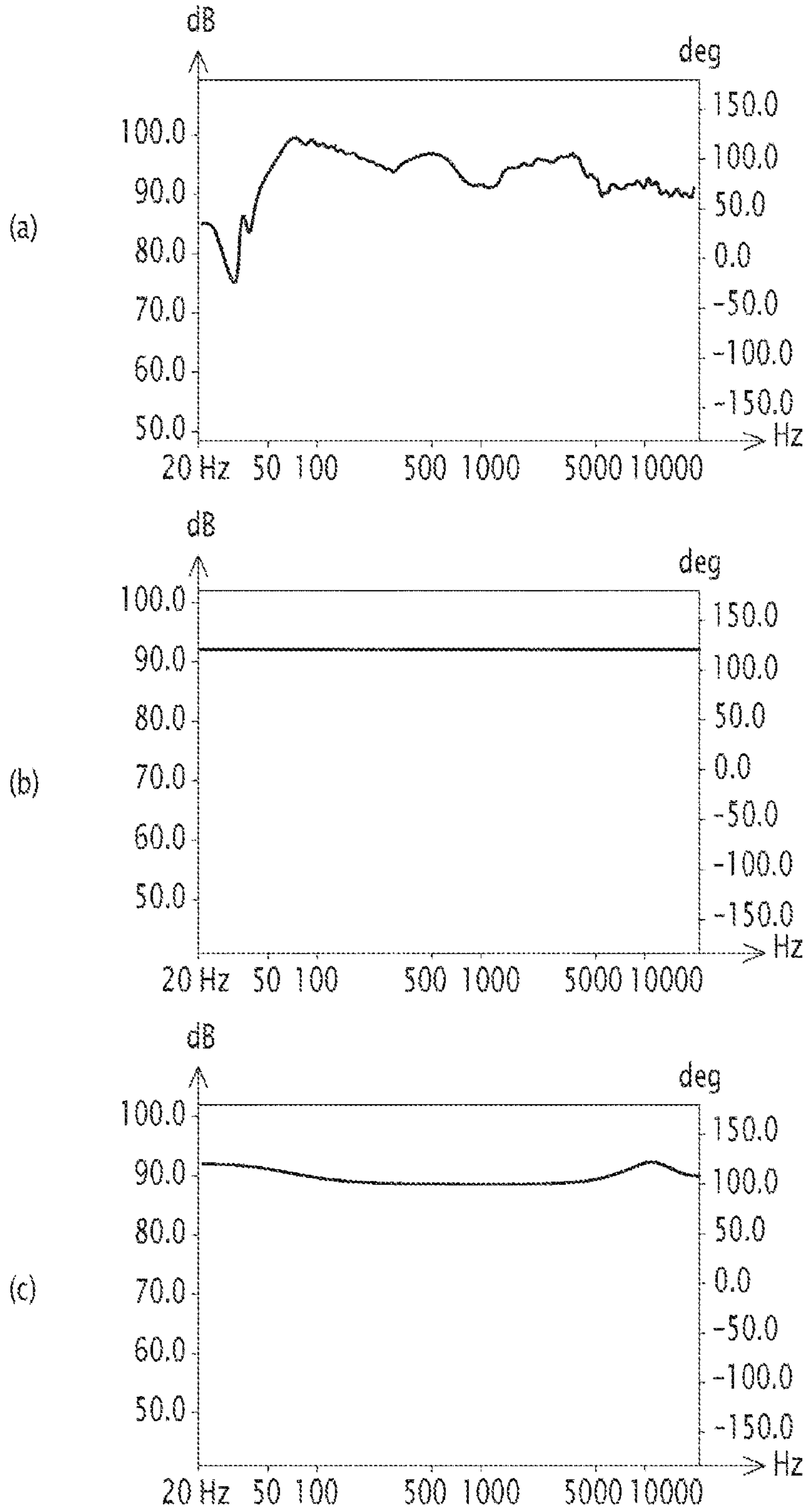
FIG. 3 illustrates the transformation of a frequency characteristic of an audio signal using the method in FIG. 2.

FIG. 3 represents curves showing, for a measured audio signal given as an example, the transformation of the amplitude curve of the signal (ordinate axis) as a function of the frequency (abscissa axis) for different stages of this transformation.

The insert (a) of FIG. 3 represents an example of a signal measured during the previously described step 100. For example, this signal is not ideal due to the intrinsic characteristics of the device components. In the state of the art, all speakers distort the signal they process.

The insert (b) of FIG. 3 shows this same corrected curve, for example after applying step 106. It is defined by the objective of leveling all the amplitudes as equally as possible as a function of frequency. In the case of analog processing, the correction will be applied by functions such as filters, for example, tank circuits. In the case of digital processing, the correction will be applied by a digital signal processor, such as a DSP, which will correct the gain of the signal for each frequency processed. In the case of mechanical processing, tuned structures such as cavities, resonators, baffles and/or absorbers will be used.

The insert (c) of FIG. 3 is an example of a modified curve after applying step 108. This amplitude modification map is born from feedback in the world of sound recording or reproduction. In the case of analog processing, the modification will be applied by functions such as filters, for example, tank circuits. In the case of digital processing, the correction will be applied by a digital signal processor, for example, a DSP which will correct the gain of the signal for each frequency processed. In the case of mechanical processing, tuned structures such as cavities, resonators, baffles and/or absorbers will be used.

Figure 4:
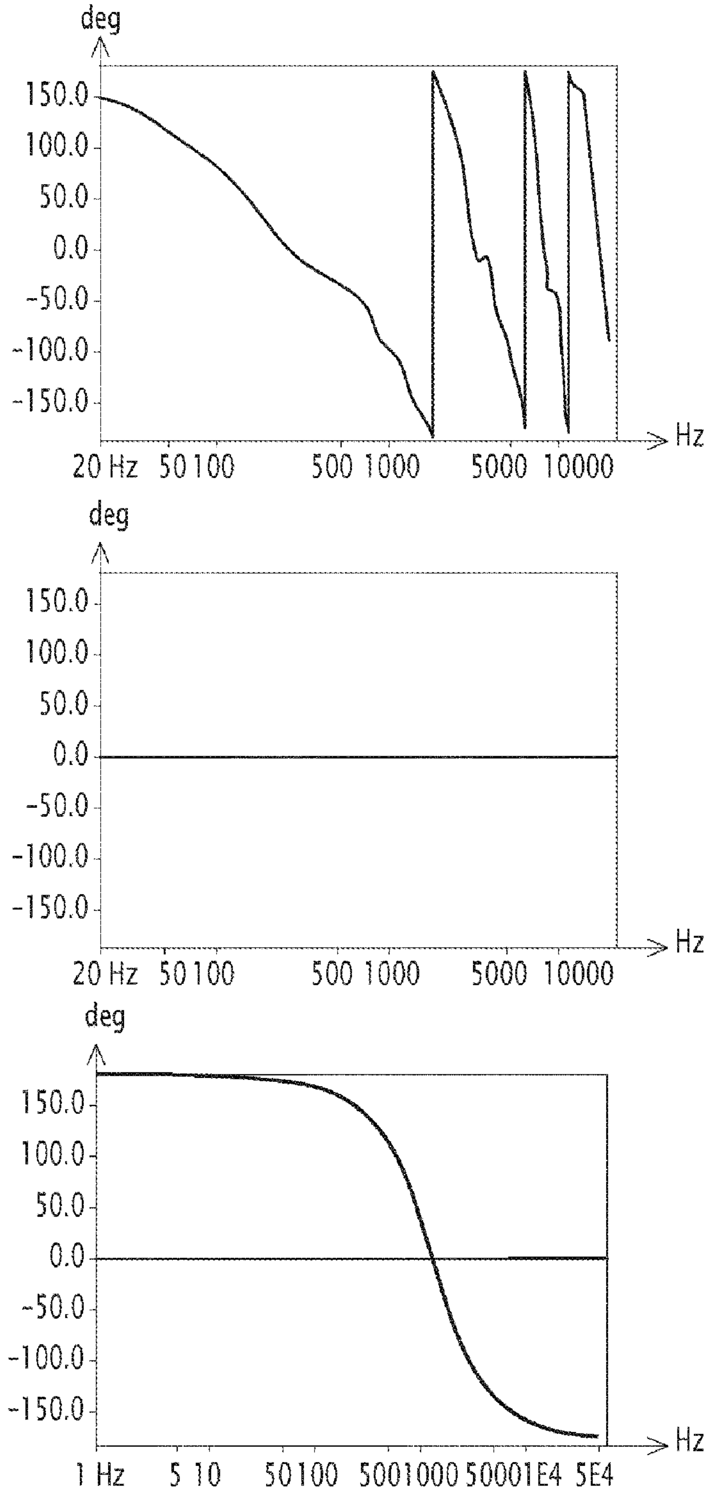
FIG. 4 illustrates the transformation of a phase characteristic of an audio signal using the method of FIG. 2.

FIG. 4, represents curves showing the signal of FIG. 3, showing the transformation steps of the phase curve of this signal (ordinate axis) as a function of the frequency (abscissa axis) at different steps of the transformation previously described.

The insert (a) of FIG. 4 represents a signal measured in step 100. Again, this signal is not ideal due to the intrinsic characteristics of the device components. In the state of the art, all speakers distort the signal they process.

The insert (b) of FIG. 4 represents this same curve corrected after step 106. It is defined by the objective of leveling all the phases as equally as possible as a function of frequency. In the case of analog processing, the correction will be applied by functions such as filters, for example, phase circuits. In the case of digital processing, the correction will be applied by a digital signal processor, such as a DSP, which will correct the phase of the signal for each frequency processed. In the case of mechanical processing, tuned structures such as cavities, resonators, baffles and/or absorbers will be used.

The insert (c) of FIG. 4 is an example of a modified curve after step 108. This phase modification map is defined to approximate the phase variations of studio or reproduction speakers. In the case of analog processing, the modification will be applied by functions such as filters, for example, phase circuits. In the case of digital processing, the correction will be applied by a digital signal processor, for example a DSP, which will correct the phase of the signal for each frequency processed. In the case of mechanical processing, tuned structures such as cavities, resonators, deflectors and/or absorbers will be used.

Figure 5:
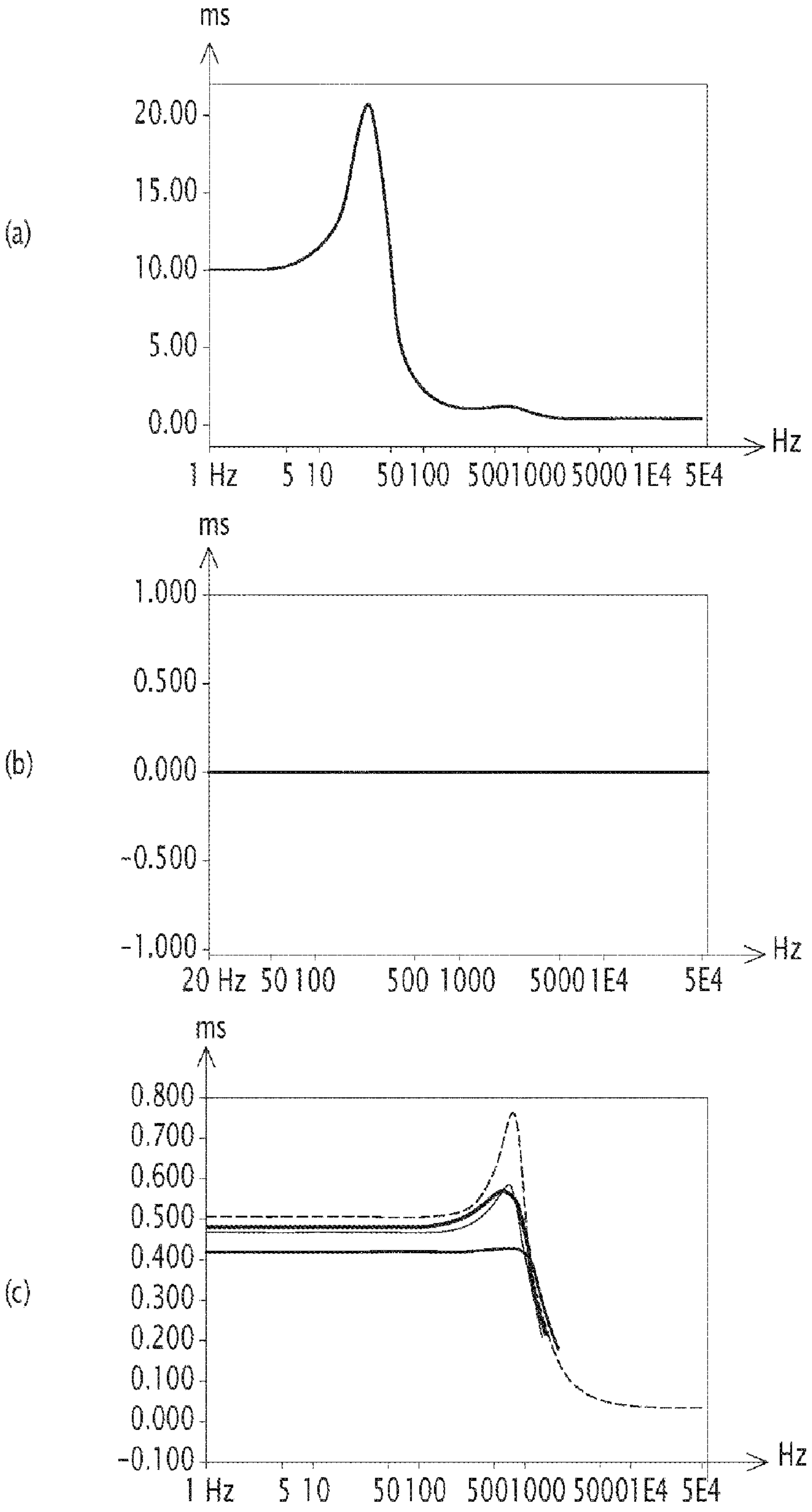
FIG. 5 illustrates the transformation of a time characteristic of an audio signal using the method of FIG. 2.

FIG. 5 represents curves showing, for a measured audio signal, given as an example, the transformation of the time curve of the signal (ordinate axis) as a function of the frequency (abscissa axis) for different steps of this transformation.

The insert (a) of FIG. 5 represents an example of a signal measured in the previously described step 100. For example, this signal is not ideal due to the intrinsic characteristics of the device components. In the state of the art, all transducers distort the signal they process.

The insert (b) of FIG. 5 represents this same corrected curve, for example after applying step 106. It is defined by the objective of leveling the time as a function of frequency as evenly as possible. In the case of analog processing, the correction will be applied by functions such as filters, for example, phase circuits with their modifications over time. In the case of digital processing, the correction will be applied by a digital signal processor, such as a DSP, which will correct the time of the signal for each frequency processed. In the case of mechanical processing, a physical shift of the loudspeakers in space and possibly tuned structures such as cavities, resonators, baffles and/or absorbers will be used.

The insert (c) of FIG. 5 is an example of a modified curve after applying step 108. This modification map is defined to approximate the time variations of studio or reproduction speakers. In the case of analog processing, the modification will be applied by functions such as filters, for example, phase circuits. In the case of digital processing, the correction will be applied by a digital signal processor, for example, a DSP, which will correct the time of the signal for each frequency processed.

More precisely, the object of the processing is to correct the time for each of the bands in the frequency decomposition (or analysis) of the signal.

In the case of mechanical processing, a physical shift of the loudspeakers in space and possibly tuned structures such as cavities, resonators, baffles and/or absorbers will be used.

Figure 6:
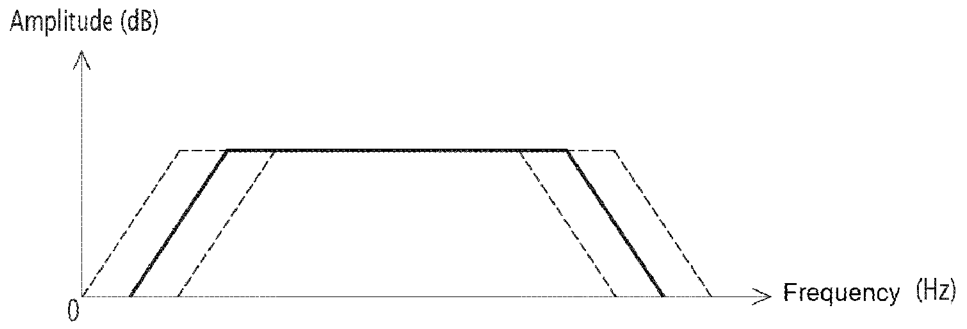
FIG. 6 illustrates the transformation of a bandwidth characteristic of an audio signal using the method of FIG. 2.

FIG. 6 represents a frequency response signal curve of an audio signal, given as an example, to illustrate the bandwidth curve transformation using the method in FIG. 2. The solid line represents a first response signal, corresponding to the frequency response typically provided by the transducers by their intrinsic performance.

By comparison, the dotted lines represent two modified signals corresponding respectively to a shortened or extended response curve.

On the one hand, this curve can be shortened (narrowed) at the level of the bass and treble to protect the loudspeakers and limit the mechanical distortion that pollutes the rest of the spectrum. In the case of analog processing, the shortening of the bandwidth will be applied by functions such as filters, for example, high pass and/or low pass circuits. In the case of digital processing, the correction will be applied by a digital signal processor, such as a DSP, performing high-pass and/or low-pass filtering algorithms. In the case of mechanical processing, tuned structures such as cavities, resonators, acoustic shorts and/or absorbers will be used.

On the other hand, this curve can be lengthened (widened) as much as possible to improve the restitution of the sound signal. In the case of analog processing, the bandwidth extension will be applied by functions such as resonant circuits. In the case of digital processing, the correction will be applied by a digital signal processor, such as a DSP, running filtering algorithms with gain. In the case of mechanical processing, tuned structures such as cavities, resonators and/or acoustic horns will be used.

Figure 7:
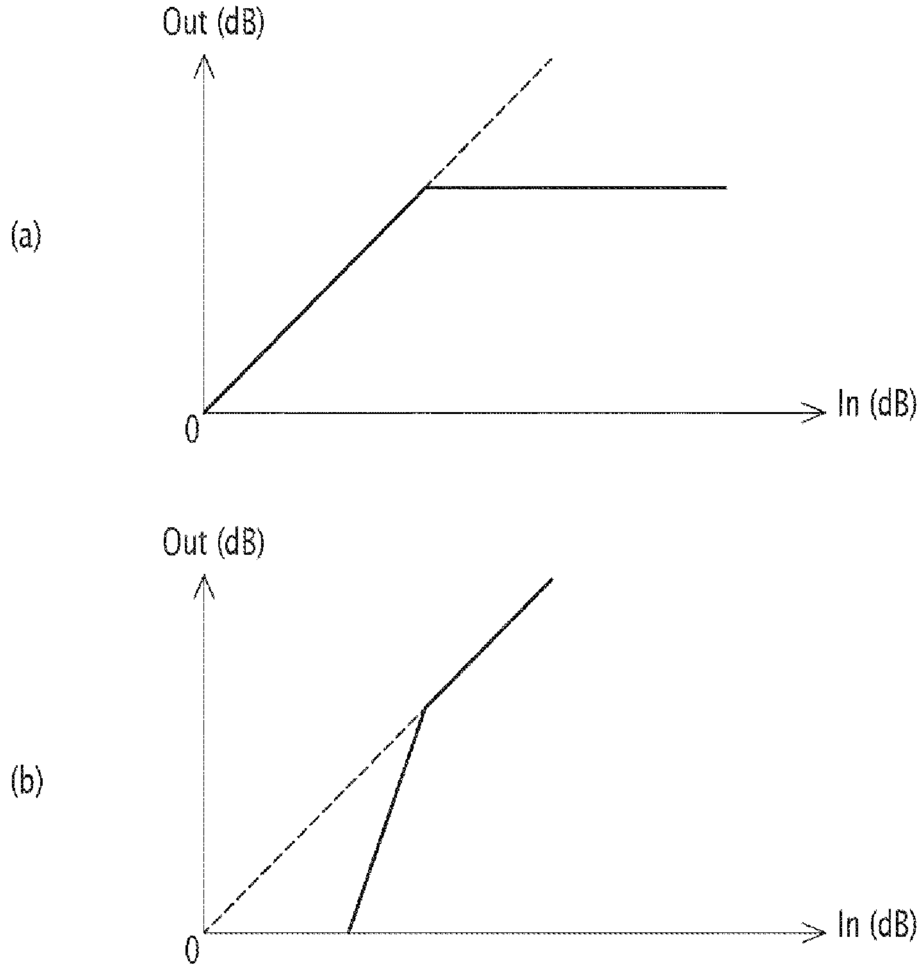
FIG. 7 illustrates the transformation of a compression/expansion characteristic of an audio signal using the method in FIG. 2.

On FIG. 7 are represented schematically the curves illustrating the transformation, by means of the method shown in FIG. 2, of the compression or expansion characteristics of a signal, given, as an example. On these curves, the output signal OUT (ordinate axis) is represented as a function of the input signal IN (abscissa axis).

The insert (a) of FIG. 7 shows the compression curve obtained after compression of the measured signal. In compression mode, the amplification ratio of the circuit under consideration decreases until it becomes negative as a function of the increase in the input signal. There is therefore a very pronounced level control effect. In the case of analog processing, the signal compression will be applied by functions such as compressor circuits, like amplifiers with variable gain depending on the input level. In the case of digital processing, signal compression will be applied by a digital signal processor, such as a DSP, running compression algorithms.

The insert (b) of FIG. 7 represents the expansion curve obtained after expansion of the measured signal. In expansion mode, the amplification rate of the circuit under consideration increases as the input signal increases. It thus has the effect of restoring the dynamics of the compressed signal, in order to improve its airiness. In the case of analog processing, the expansion of the signal will be applied by functions such as expander circuits, like amplifiers with variable gain according to the input level. In the case of digital processing, the signal expansion will be applied by a digital signal processor, such as a DSP, running expansion algorithms.

Figure 8:
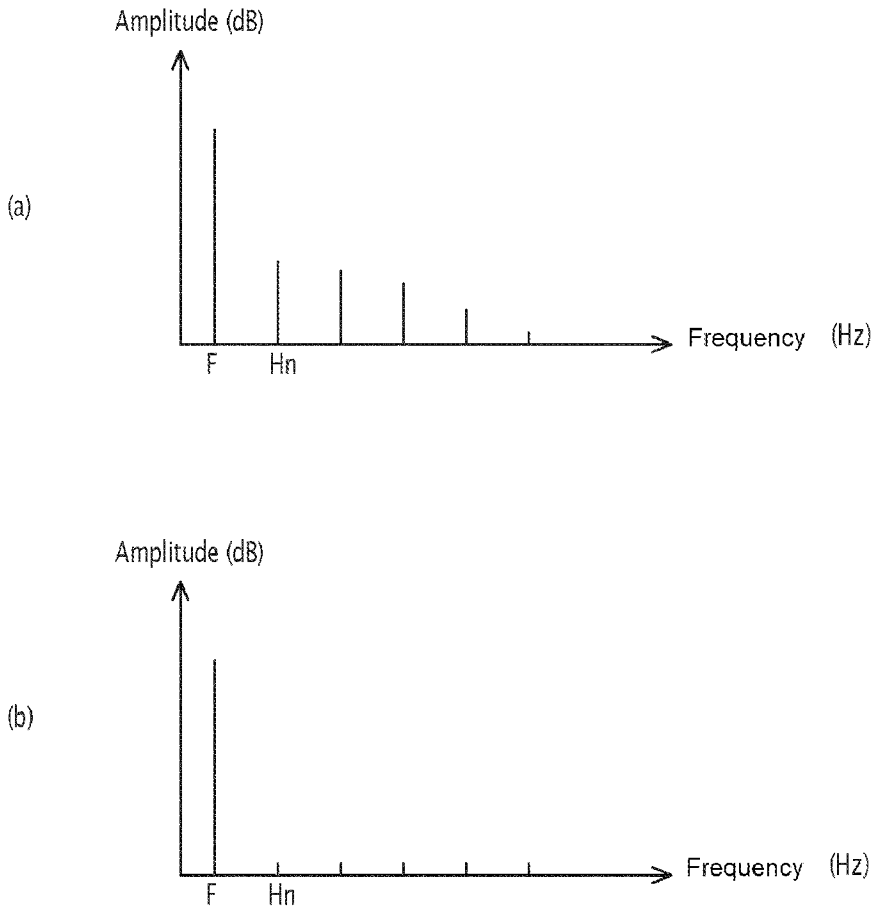
FIG. 8 illustrates the transformation of a distortion characteristic of an audio signal using the method of FIG. 2.

FIG. 8 represents curves showing, for a measured audio signal, given as an example, the signal transformation obtained by modifying distortion characteristics, by means of the method of FIG. 2.

The insert (a) of FIG. 8 represents the spectral analysis consisting of a fundamental frequency F and its harmonics Hn evoking a high distortion rate. A high distortion rate implies the addition of unwanted signals not present in the original signal. This high distortion rate is mainly due to electrical and mechanical defects in the reproduction systems or by a phase and time non-linearity of the system. It is also possible to increase the rate of distortion of the signal to simulate defects not present in the original, to color the sound. By coloring, is meant, in a general way, giving specific characteristics to the audio signal. A controlled distortion can, for example, make it possible to approach the harmonic distortion characteristics of high-performance loudspeakers. In the case of analog processing, the increase in distortion will be obtained by adding multiple frequencies to the chosen fundamental. In the case of digital processing, the increase in distortion will be achieved by a digital signal processor, such as a DSP, running algorithms that generate harmonic frequencies.

The insert (b) of FIG. 8 represents the spectral analysis consisting of a fundamental and its harmonics evoking a weakened distortion rate after transformation. A low distortion rate implies a reproduced signal closer to the original. In the case of an analog processing, the weakening of the distortion will be obtained by suppression of the undesirable frequencies thanks to filtering functions or phase and time corrections. In the case of digital processing, the distortion reduction will be obtained by using a digital signal processor, such as a DSP, executing filtering and/or phase and time correction algorithms.

Figure 9:
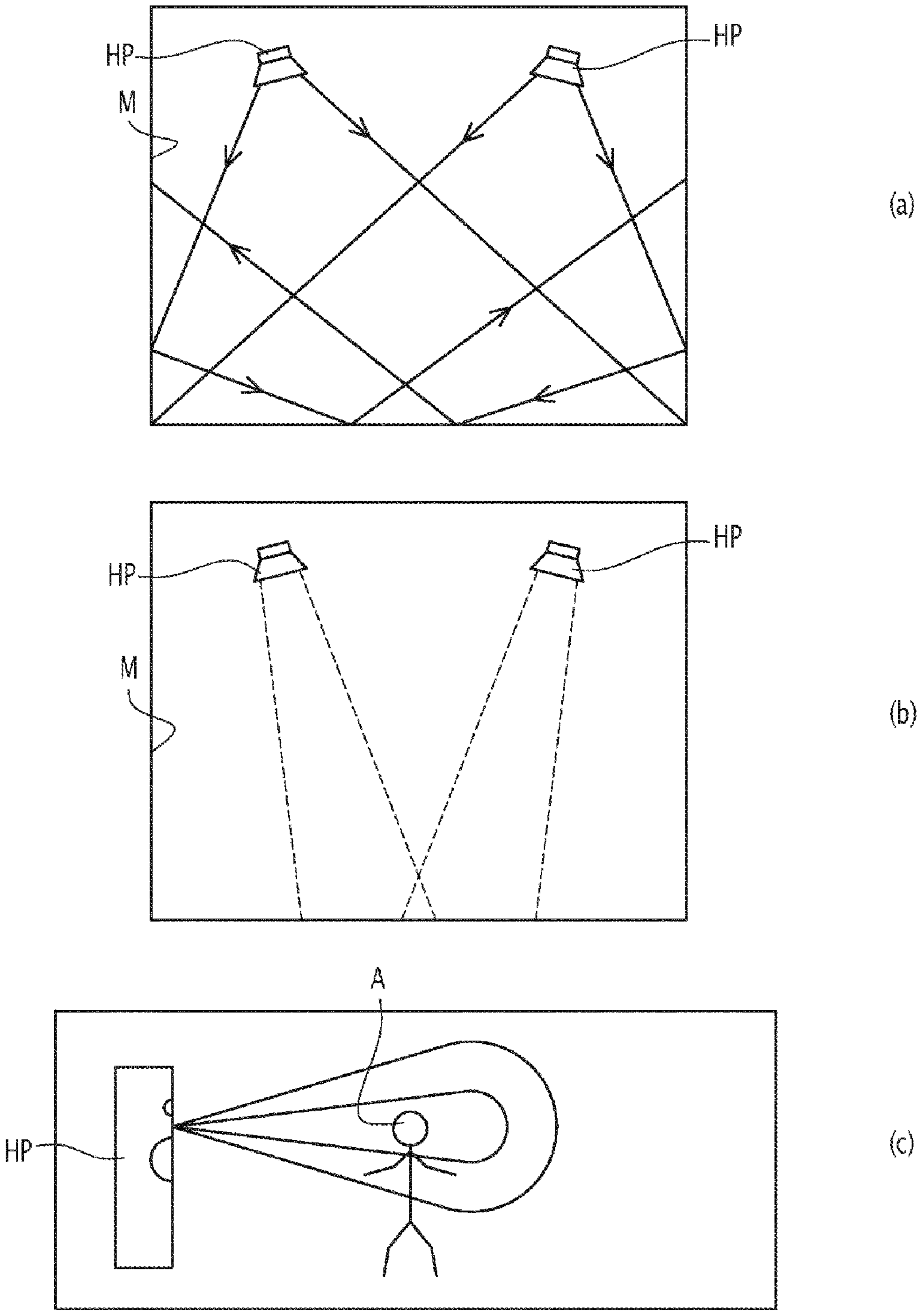
FIG. 9 illustrates the transformation of a directivity characteristic of an audio signal using the method of FIG. 2.

FIG. 9 represents different orientations of sounds from loudspeakers HP according to different directivity characteristics.

The insert (a) of FIG. 9 represents an open horizontal directivity diagram, highlighting the scattering of sounds on the walls M, thus increasing the percentage of reverberated sounds interfering with the direct sounds.

The inserts (b) and (c) of FIG. 9 represent more closed directivity patterns to limit the reverberation on the walls M. The listener A will hear more direct sound than reverberated sound. This result is achieved by a combination of mechanical-acoustic and electrical solutions such as the addition of loudspeakers, waveguides and/or the control of a time and phase variation between them.

Figure 10:
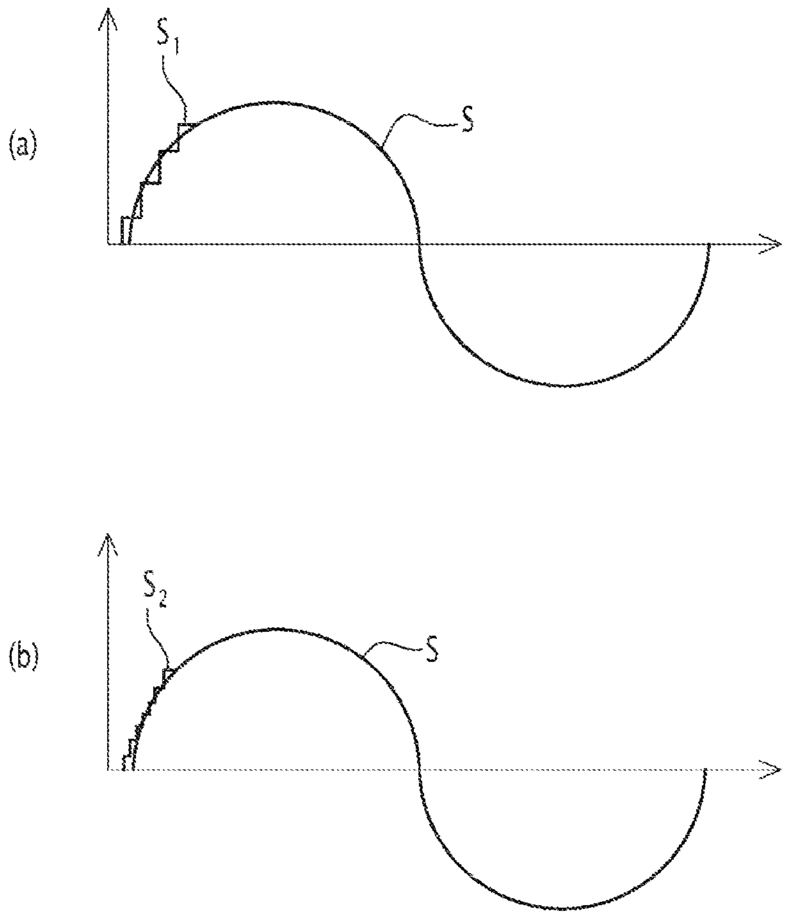
FIG. 10 illustrates the transformation of a sampling characteristic of an audio signal using the method of FIG. 2.

FIG. 10 represents curves S1, S2 showing the amplitude (ordinate axis) of a sampled signal as a function of time (abscissa axis). The reference S indicates the corresponding analog signal before sampling.

The insert (a) of FIG. 10 represents the curve S1 of a coarse sampling in time and quantification. For example, this is the CD standard characterized by the 16-bit format, with a sampling frequency of 44.1 kHz.

The insert (b) of FIG. 10 represents the curve S2 of a finer sampling in time and in quantification. This transformation is done by increasing the number of bits, to pass for example from 16 bits to 24 bits, and the increase in the number of samples per unit of time, to pass, for example, from a sampling frequency of 44.1 kHz to 192 kHz. This transformation makes it possible to reduce the rate of distortion by adding signals by interpolation, which reduces the size of the increments. The listening comfort is thus increased. This transformation is carried out digitally by an asynchronous sample rate converter, better known by the acronym ASRC.

Figure 11:
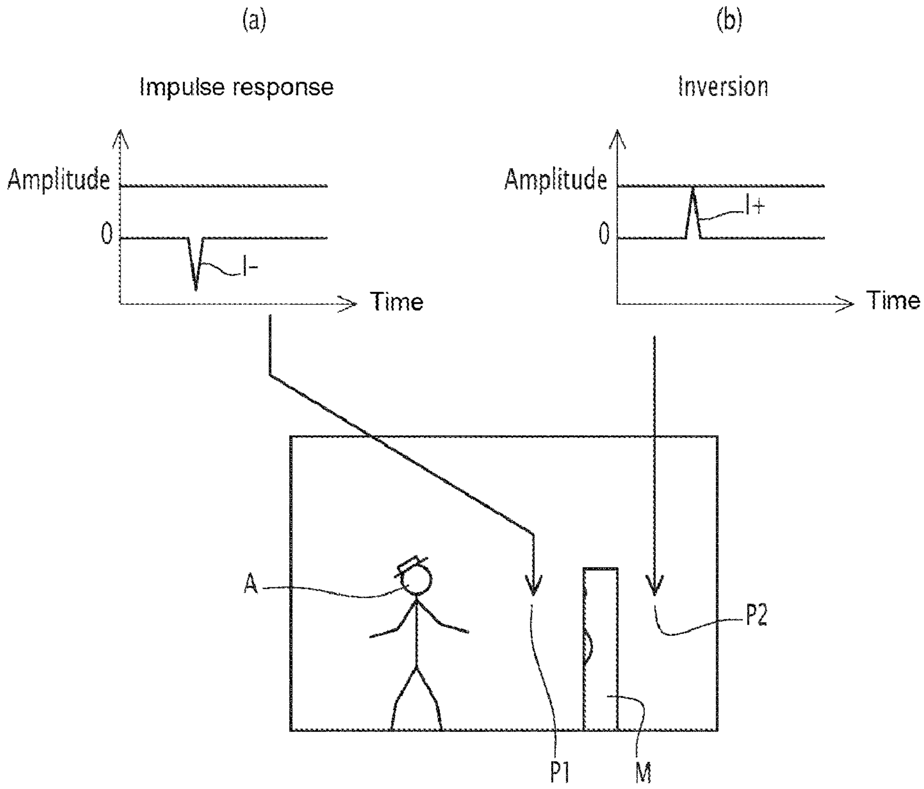
FIG. 11 illustrates the transformation of an absolute phase characteristic of an audio signal using the method of FIG. 2.

In the method represented in FIG. 11, the positioning of the absolute phase is shown, which corresponds to the electrical polarity of the loudspeaker group to the impulse response, thus modifying the sensation of depth of the sound scene.

The insert (a) of FIG. 11 represents a negative impulse response I− for a perception of proximity of the sound (position P1).

The insert (b) of FIG. 11 represents a positive impulse response I+ for an increased perception of the depth of the scene (position P2).

One can switch from one to the other by reversing the polarity of the speaker group connection.

Figure 12:
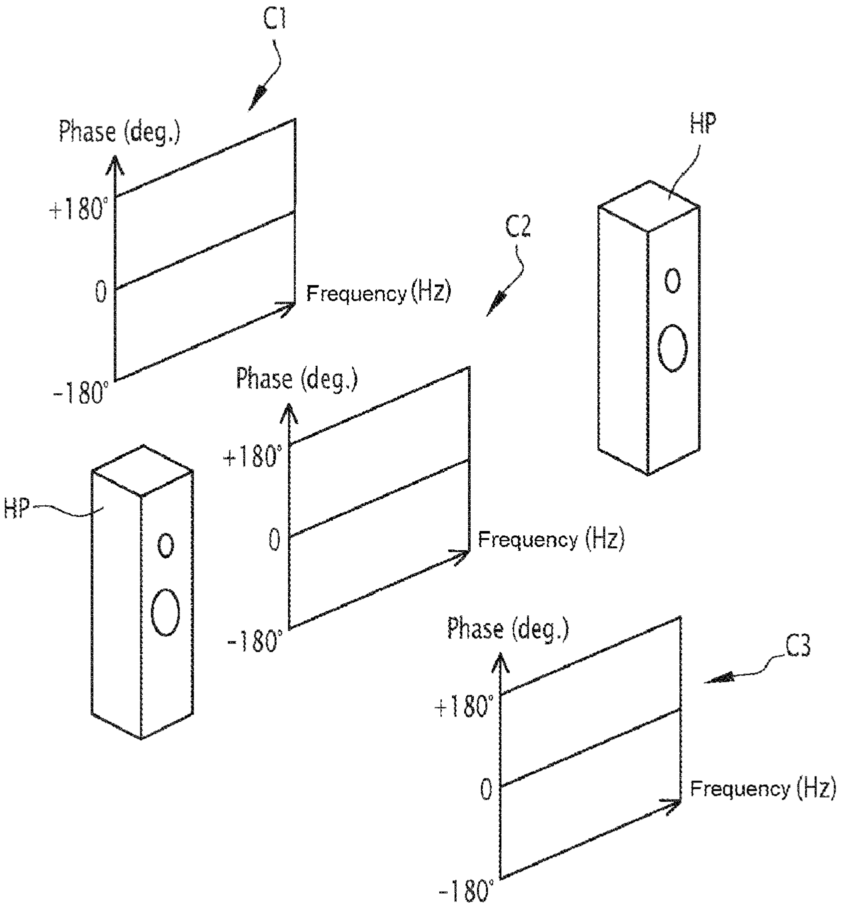
FIG. 12 illustrates the transformation of a reference point characteristic of all the frequencies of an audio signal using the method in FIG. 2.

In the method represented in FIG. 12, the positioning of the reference phase is shown.

FIG. 12 illustrates several possible positions C1, C2, C3 of reference phase. The reference phase is a straight line at 0 degrees, depending on a desired position relative to the device such as a loudspeaker HP. For example, this position can be at a negative distance, more or less distant for an increased perception of scene depth. It can also be at a positive distance, more or less distant to give a feeling of proximity of the scene.

This transformation can be carried out in digital by a processor, such as a DSP, which recalculates the right phase at the chosen distance.

Figure 13:
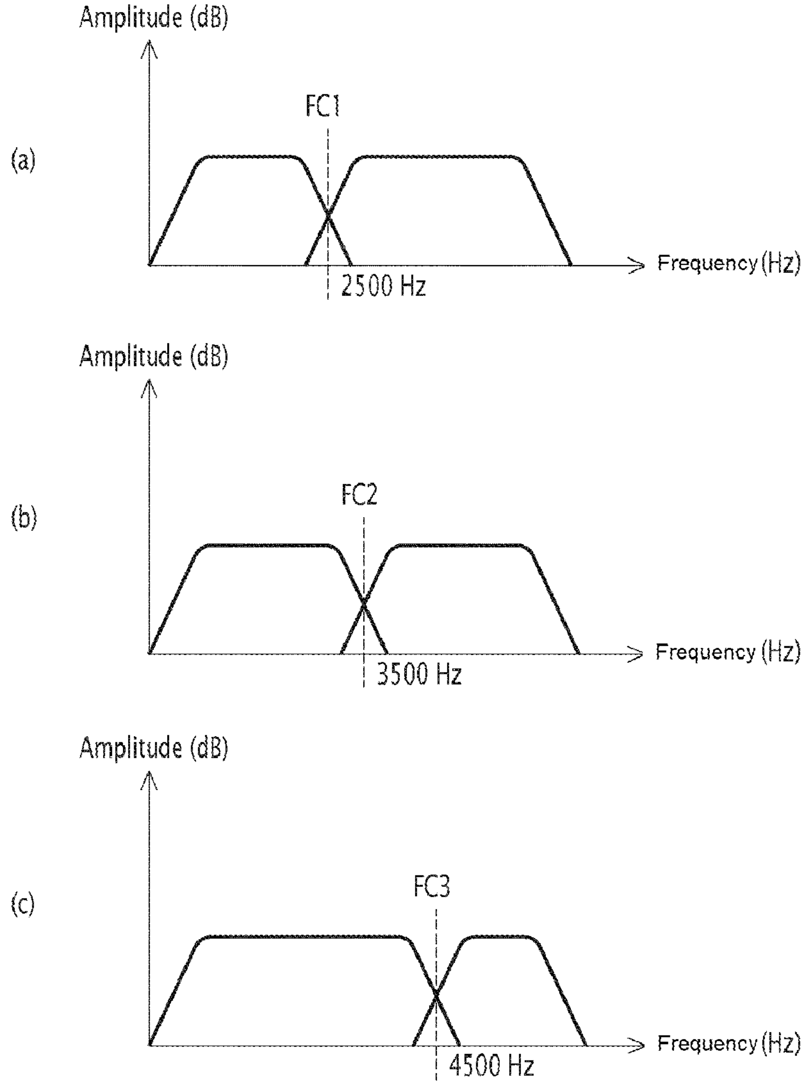
FIG. 13 illustrates the transformation of an audio signal involving the modification of cutoff frequencies using the method of FIG. 2.

FIG. 13 represents different cases of bandwidth distribution per loudspeaker, corresponding to the displacement of the cut-off frequency or frequencies.

The insert (a) of FIG. 13 represents a crossover frequency FC1 shifted towards the bass (the low frequencies), which increases the distortion rate and decreases the directivity of the device.

The insert (b) of FIG. 13 represents a uniformly distributed bandwidth (cutoff frequency FC2 located essentially in the middle of the frequency band), to balance the area of use between the different loudspeakers, taking into consideration mechanical, electrical, power handling and/or directivity limits.

The insert (c) of FIG. 13 represents a crossover frequency FC3 shifted towards the high frequencies of the audio band, to protect the loudspeaker intended to receive these frequencies, which then receives less energy. On the other hand, this increases the directivity of the device.

In all three cases, the shift of the crossover frequency and slopes is achieved by changing the type of filter and its parameterization, both in analog and in digital.

In many embodiments, the control module automatically adapts the selection of a typical profile as a function of information about the particular musical style of a track. In other words, the control module is configured to automatically recognize a musical genre of the played signal. In this way, the control module can determine what type of music is being played and adjust its settings automatically to suit the recording conditions and the type of work being played. The description is particularly applicable to the case where the system includes two separate active multi-channel speakers (left/right).

For example, music recognition is carried out by sampling the signal, then analyzing the signal by one or more possible means, such as online services or applications, such as Shazam or Gracenote (registered trademarks) or other, and/or by detecting and comparing music samples with reference data stored in a remote database via an internet connection or a local database. The determination of the type of music can also be done via the information contained in the music file (ID3 tag for the MP3 format for example), or by any other means of determination, such as a determination algorithm based on one or more characteristics of the music (tempo, harmonic content, etc . . . ).

For example, the recognition method may differ according to whether the recognition is done in the receivers (the speakers) or in the transmitter. In a wireless link, if the recognition is done in the receivers, there must be a synchronization between the receivers, in order to avoid any disparity of settings between the receivers. The model that will be used preferably will be the master/slave: the “master” device will be responsible for determining the type of music and the setting to be applied and to share the result with the “slave” devices that will apply the requested setting program that will be stored in each of them. The analysis can also be done in the transmitter that then takes the status of “master”. Once the musical genre has been identified, the control module chooses a typical profile corresponding to the identified musical genre. The typical profile can be a set of settings or “formulas” for one or more characteristics of the signal, and the combination of these settings changes the behavior of the loudspeaker. A single loudspeaker may therefore behave acoustically like another one designed differently or intended for a different type of music. Loudspeakers may be delivered with a few basic settings (for example four) predefined by the loudspeaker manufacturer and subsequently updated by the user.

In practice, the settings may include some or all of the following elements: gain, phase, time, distortion, bandwidth, bandwidth distribution per speaker, dynamics compression, directivity, absolute phase, equalization.

For example, a typical profile corresponding to a music genre called current music may have the following settings:

Gain: The gain of the signal in the high frequency channel is increased.

Phase: the phase rotations induced by the various filters are preserved (they will not be corrected). The cut-off frequencies of the filters between the bass and mid-range signals are shifted, so it will be necessary to adjust the phase curves in order to maintain the desired energy at the connection.

Time: the time steps inherent to the acoustic loads and filtering are also preserved (no correction).

Distortion: the choice of filtering, slope or type, allows to control or limit the mechanical distortion rate of the loudspeakers as well as the phase and time distortion.

Bandwidth: a high-pass filter cuts signals at frequencies below 60 Hz

The bandwidth distribution per loudspeaker is chosen in such a way as to cause an overlap of the bass and midrange signals at their connection frequency. For example, for a connection frequency chosen at 150 Hz, the bass transducer will be cut at frequencies above 200 Hz, and the midrange transducer will start at 100 Hz.

Compression: the differences in dynamics between the peaks and the average amplitude will be limited.

Directivity: the cutoff frequency between the midrange and the treble is shifted up one octave.

Absolute phase: the polarity of the speakers is not reversed.

Equalization:

at 42.5 Hz, +2.5 dB, Q factor=3.4 at 200 Hz, −0.5 dB, Q factor=2.2 at 3400 Hz, +1.5 dB, Q factor=0.71 at 20000 Hz, +5.0 dB, Q factor=0.50.

Other examples are possible.

For example, a typical profile corresponding to a musical genre known as acoustic may include the following settings:

Gain: the gain setting of the signals is chosen so that there is no difference in amplitude between the frequency bands.

Phase: the phase rotations caused by the loads and the various filters are eliminated by means of corrections (for example, by DSP).

Time: the signal processing delay is adjusted for each frequency band so that these signals are all emitted by their respective transducers with the same overall delay.

Distortion: the choice of filtering, and its characteristics (type, slope, etc.) will make it possible to limit the rate of mechanical distortion of the transducers as much as possible and to eliminate phase and time distortions.

Bandwidth: No bandwidth limit.

The distribution of the frequency bands allocated to each transducer is guided by the trade-off between the directivity of the array, the distortion and the mass of the mobile equipment.

Compression: No dynamic range limits are applied.

Directivity: The directivity is controlled on and off axis.

Sampling: Oversampling at maximum during digital processing. The polarity of the transducers is reversed so that the impulse response is positive.

Reference point: The phase and time curve are straight from the moment the signal is emitted (front of the speaker).

The equalization is chosen to linearize the frequency response amplitude curve as much as possible.

Other examples can be considered.

The present invention is by no means limited to the described and shown embodiments, but the skilled person will know how to bring to it any variant in accordance with his mind.

The invention claimed is:

1. A method for transforming an audio signal for an electro-acoustic transducer, comprising: wherein said audio signal is modified in a combined manner using a plurality of audio signal characteristics as a function of a typical profile selected by a control module, to provide specific characteristics to the audio signal, said audio signal characteristics being selected from the list including: gain, phase, time, distortion, bandwidth, bandwidth distribution per speaker, dynamics compression/expansion, directivity, sampling, absolute phase corresponding to the electrical polarity of a group of loudspeakers at the impulse response, displacement of the reference point where all frequencies are in phase, and wherein the control module automatically adapts the selection of a typical profile as a function of the information of the determined musical style of a music track, the selected typical profile comprising settings of the electro-acoustic transducer relative to the audio signal characteristics.

2. The method according to claim 1, wherein the transformation of the signal is carried out in one or more steps consisting of at least one corrective action to linearize the signal in order to match the recording data, and a modification action to type the signal as a function of the selected type profile.

3. The method according to claim 1, wherein the transformation of the signal is carried out according to a digital method using a processor.

4. The method according to claim 1, wherein the transformation of the signal is carried out according to an analog method using electrical and/or electronic components.

5. The method according to claim 1, wherein the transformation of the signal is carried out according to one or more mechanical means using tuned structures, acoustic lenses and/or a transformation of the geometric characteristics of the device.

6. The method according to claim 1, wherein the control module is manually operated by the user.

7. The method according to claim 1, wherein the control module automatically adapts as a function of information contained on a remote service for recognizing the signal and identifying a typical profile.

8. The method according to claim 1, wherein the control module automatically adapts as a function of user preferences identified by the device.

9. A device for transforming an audio signal for an acoustic transducer, comprising: wherein the device is configured to modify said signal in a combined manner using a plurality of signal characteristics as a function of a typical profile selected by a control module, to give specific characteristics to the audio signal, said audio signal characteristics being chosen from the list comprising: gain, phase, time, distortion, bandwidth, bandwidth distribution per speaker, dynamics compression/expansion, directivity, sampling, absolute phase corresponding to the electrical polarity of a group of speakers at the impulse response, displacement of the reference point where all frequencies are in phase, and wherein the control module automatically adapts the selection of a typical profile as a function of the information of the determined musical style of a music track, the selected typical profile comprising settings of the electro-acoustic transducer relative to the audio signal characteristics.

* * * * *